US012122082B2

United States Patent
Kammerloher (10) Patent No.: US 12,122,082 B2
(45) Date of Patent: Oct. 22, 2024

(54) METHOD AND DEVICE FOR INSPECTING INJECTION-MOLDED PARTS, IN PARTICULAR PIPETTE TIPS

(71) Applicants: HEKUMA GMBH, Hallbergmoos (DE); Jakob Kammerloher, Wolfersdorf (DE)

(72) Inventor: Jakob Kammerloher, Wolfersdorf (DE)

(73) Assignees: Jakob Kammerloher, Wolfersdorf (DE); HEKUMA GMBH, Hallbergmoos (DE)

( * ) Notice: Subject to any disclaimer, the term of this patent is extended or adjusted under 35 U.S.C. 154(b) by 552 days.

(21) Appl. No.: 17/285,442

(22) PCT Filed: Oct. 17, 2019

(86) PCT No.: PCT/EP2019/078256
§ 371 (c)(1),
(2) Date: Apr. 14, 2021

(87) PCT Pub. No.: WO2020/079170
PCT Pub. Date: Apr. 23, 2020

(65) Prior Publication Data
US 2021/0339446 A1    Nov. 4, 2021

(30) Foreign Application Priority Data
Oct. 19, 2018  (DE) ...................... 10 2018 126 019.9

(51) Int. Cl.
*B29C 45/76* (2006.01)
*G01B 11/245* (2006.01)
*G01B 11/27* (2006.01)

(52) U.S. Cl.
CPC ........ *B29C 45/7686* (2013.01); *G01B 11/245* (2013.01); *G01B 11/27* (2013.01);
(Continued)

(58) Field of Classification Search
CPC .... B29C 45/7686; G01B 11/245; G01B 11/27
(Continued)

(56) References Cited

U.S. PATENT DOCUMENTS

| 5,904,413 A * | 5/1999 | Ruegenberg | G01B 11/272 |
|---|---|---|---|
| | | | 356/73.1 |
| 2002/0092367 A1* | 7/2002 | Bell | B01L 3/0275 |
| | | | 73/864.14 |
| 2012/0210772 A1* | 8/2012 | Izumo | G01F 25/0092 |
| | | | 73/40 |

FOREIGN PATENT DOCUMENTS

| DE | 102014102280 B3 * | 8/2015 | ............ B01L 3/0275 |
|---|---|---|---|
| EP | 1677070 A1 * | 7/2006 | ......... G01B 11/2425 |

OTHER PUBLICATIONS

The FreeDictionary.com, Dictionary Definition "Mandrel", retrieved from https://web.archive.org/web/20041110230145/https://www.thefreedictionary.com/mandrel on Sep. 23, 2023. (Year: 2004).*

(Continued)

*Primary Examiner* — Mohammad Ali
*Assistant Examiner* — Joshua T Sanders
(74) *Attorney, Agent, or Firm* — McCoy Russell LLP (57) ABSTRACT

Method for inspecting elongate injection-molded parts having an axis of symmetry in a holding device, comprising:
   detecting a reference area in a first measurement area of the part in the holding device through detection means, wherein the reference area is selected such that the axis of symmetry of the part can be calculated from the measurement data of the reference area,
   calculating the axis of symmetry from the measurement data of the measured reference area,
   measuring the spatial position of a section of axis of symmetry of a second measurement area, spaced apart from the first measurement area in axial direction, of the part, and (Continued)

determining whether the spatial position of the section of axis of symmetry, measured in the third step, of the part, coincides in the second measurement area with the axis of symmetry calculated in the second step, or not.

16 Claims, 4 Drawing Sheets

(52) U.S. Cl.
CPC ............... *B29C 2945/76103* (2013.01); *B29C 2945/76464* (2013.01); *B29C 2945/76899* (2013.01)

(58) Field of Classification Search
USPC ......................................................... 700/204
See application file for complete search history.

(56) References Cited

OTHER PUBLICATIONS

ISA European Patent Office, International Search Report Issued in Application No. PCT/EP2019/078256, Feb. 6, 2020, WIPO, 2 pages.

\* cited by examiner

METHOD AND DEVICE FOR INSPECTING INJECTION-MOLDED PARTS, IN PARTICULAR PIPETTE TIPS

CROSS REFERENCE TO RELATED APPLICATIONS

The present application is a U.S. National Phase of International Application No. PCT/EP2019/078256 entitled "METHOD AND DEVICE FOR INSPECTING INJECTION-MOULDED PARTS, IN PARTICULAR WAFER TIPS," and filed on Oct. 17, 2019. International Application No. PCT/EP2019/078256 claims priority to German Patent Application No. 10 2018 126 019.9 filed on Oct. 19, 2018. The entire contents of each of the above-listed applications are hereby incorporated by reference for all purposes.

TECHNICAL FIELD

The invention relates to a method and a device for inspecting elongate injection-molded parts, in particular pipette tips, in a holding device like, for example, a workpiece carrier.

BACKGROUND AND SUMMARY

Such a method is known from DE 10 2014 102 280, wherein the divergence of the tip end of the pipette tip from the axial direction is detected by means of a camera in axial direction above a pipette tip and a camera below the pipette tip. In this method, for example a correctly formed pipette tip in an inclined position in the workpiece carrier is not recognised and sorted out as waste only because, due to the misalignment of the pipette tip in the workpiece carrier, the divergence of the tip end of the pipette tip from the predetermined axial direction is evaluated as a defect. Because the pipettes themselves and the workpiece carrier often have unevenness like, for example, burrs at the edges of the bores, there is often unnecessary rejection due to an inclined position of the pipette tip in the workpiece carrier.

It is the object of the invention to improve the known method such that the rejection of injection-molded parts is reduced and good parts are not sorted out as waste, only because they are positioned in an inclined position in the holding device.

According to the invention, this object is solved essentially in that a reference area, extending in axial direction at the elongate injection-molded part in the workpiece carrier, is detected and, starting from the reference area, the injection-molded part is measured, as stated in claim 1.

In detail, the invention relates to a method for inspecting elongate injection-molded parts P having an axis of symmetry S, in particular pipette tips, in a holding device H, comprising the following steps:
  detecting a reference area RP in a first measurement area 1 of the elongate injection-molded part P in the holding device H through detection means K1, wherein the reference area RP is selected such that the axis of symmetry S of the injection-molded part P can be calculated from the measurement data of the reference area RP (first step),
  calculating the axis of symmetry S from the measurement data of the measured reference area RP (second step),
  measuring the spatial position of a section S2 of axis of symmetry of a second measurement area 2, spaced apart from the first measurement area 1 in axial direction, of the elongate injection-molded part P (third step), and
  determining whether the spatial position of the section S2 of axis of symmetry of the injection-molded part P measured in the third step coincides in the second measurement area 2 with the axis of symmetry S calculated in the second step, or not.

Hereby, the reference area RP, extending in axial direction of the injection-molded part, is scanned by an electronic detection means aligned laterally or transverse to the axis of symmetry of the injection-molded part. The reference area RP can be formed in different ways. Preferred is a planar reference area, for example in form of a shell surface of a rotation-symmetric injection-molded part like a pipette tip. Also, for example, corner points at a rectangle can be provided as a reference area, from whose data the axis of symmetry can be calculated. Hereby, for example, the four corner points of a rectangle are to be detected by the electronic detection means which looks laterally at the axis of symmetry. Also in the arrangement of four corner points, the reference area extends in axial direction or in the direction of the axis of symmetry which results from the reference points.

The reference area is preferably selected in a stable and thicker-walled area of the injection-molded part, because this area is more stable with regard to deformation than a thin-walled area. In other words, the reference area RP is provided in the measurement area 1.

Advantageously, a tolerance area T is determined around an axis of symmetry S calculated from the reference area RP, and it is calculated whether the position of the section S2 of axis of symmetry, detected by measuring, is within the tolerance area T or not.

As already mentioned, advantageously, a shell surface or a part of a shell surface at a rotation-symmetric injection-molded part P is used as reference area RP in the first measurement area 1.

Hereby, lines or individual points of a shell surface can also be selected as reference area.

It is also possible to use at least an area, transverse to the axis of symmetry (S), of the injection-molded part as reference area RP. For example, two cross-sectional areas of the injection-molded part, spaced apart in axial direction and transverse to the axis of symmetry S, can be used as reference area. For an injection-molded part in form of a pipette tip of transparent material, by means of the electronic detection means arranged laterally of the axis of symmetry, the cross-sectional areas can be scanned for measuring thickness of the wall thickness of the pipette tip, from which the axis of symmetry can be calculated from the thickness dimensions of the cross-sectional areas.

For detecting an inclined position of the axis of symmetry in relation to an axis of the holding device, the reference area, detectable essentially laterally at the injection-molded part, is detected by a detection means like, for example, an electronic camera which is aimed at the reference area transverse to the axis of symmetry.

For detecting a curve or inclined position of the injection-molded part, the position of a section S2 of axis of symmetry of the injection-molded part is measured by a detection means like, for example, an electronic camera, which is aimed in axial direction at the second measurement area 2 of the injection-molded part, or also by a detection means which, laterally or transverse to the section S2 of axis of symmetry, detects the position thereof.

For economy of electronic detection means, it is advantageous when, by means of a detection means or a camera using mirror deflections, the position of the section of axis of symmetry in axial direction is detected, and, as well, the measurement data of the reference area transverse to the axial direction are detected.

Advantageously, the method according to the invention is carried out using a device for inspecting elongate injection-molded parts P having an axis of symmetry S, in particular pipette tips, in a holding device H, comprising a calculating unit C in which a reference area R at the injection-molded part to be measured is pre-set as calculation base, wherein a reference axis RA can be calculated from the data of the reference area R, at least a detection means K1, which is aimed, transverse to the axis of symmetry S of an injection-molded part P, at this injection-molded part held in the holding device H and is formed such that the detection means detects a reference area RP at the injection-molded part P corresponding to the reference area R pre-set in the calculating unit C, and calculates an axis of symmetry S of the measured reference area RP from the measurement data, and at least a further detection means K2 for measuring the axis of symmetry S in a second measurement area 2 at a distance in axial direction from the first measurement area 1.

Advantageously, the detection means in the first measurement area 1 and/or in the second measurement area 2 are offset to one another by 90° and are aimed at the axis of symmetry of the injection-molded part.

Hereby, the detection means in the first measurement area 1 can be aligned transverse to the axis of symmetry of the injection-molded part and, in the second measurement area 2, can be aimed in axial direction at a front end of the injection-molded part.

In the first measurement area, detection means spaced apart in axial direction can be aimed laterally at the axis of symmetry, for example for detecting a cross-sectional area of the injection-molded part.

Electronic cameras, interferometers or infrared sensors, 3D sensors or stereo cameras can be provided as electronic detection means, wherein different detection means also can be provided in different areas.

It can be advantageous to provide a mandrel for receiving a rotation-symmetric injection-molded part like, for example, a pipette tip, which abuts by means of an abutment surface at the inner circumference of the pipette tip in a form-fitting manner and has, on an exposed outer portion, the reference area which is laterally scanned by a camera.

Such a metrological extension of the injection-molded part can, for example, also be provided at a planar injection-molded part which is joined with the injection-molded part in a form-fitting manner.

Advantageously, the mandrel is provided in longitudinal direction with a bore for applying underpressure or overpressure so that a pipette tip can be sucked on and by overpressure pulled off again.

The mandrel can advantageously be rotatably supported, for measuring the mandrel position or the axis of symmetry thereof by rotating of the mandrel.

For pulling off the injection-molded part or the pipette tip from the mandrel, a sleeve can be provided at the outer free end of the mandrel, which is movable in relation to the mandrel in the axial direction of the mandrel or vice versa. Instead of a sleeve, another mechanical element can also be provided for pulling a pipette tip off the mandrel.

BRIEF DESCRIPTION OF THE FIGURES

Exemplary embodiments of the invention are described in detail with reference to the drawing, in which FIG. 1a shows a sketch for illustrating the measurement method, FIG. 1b schematically shows the pre-set reference area R with reference axis RA.

DETAILED DESCRIPTION

Figures 1A, 1B:
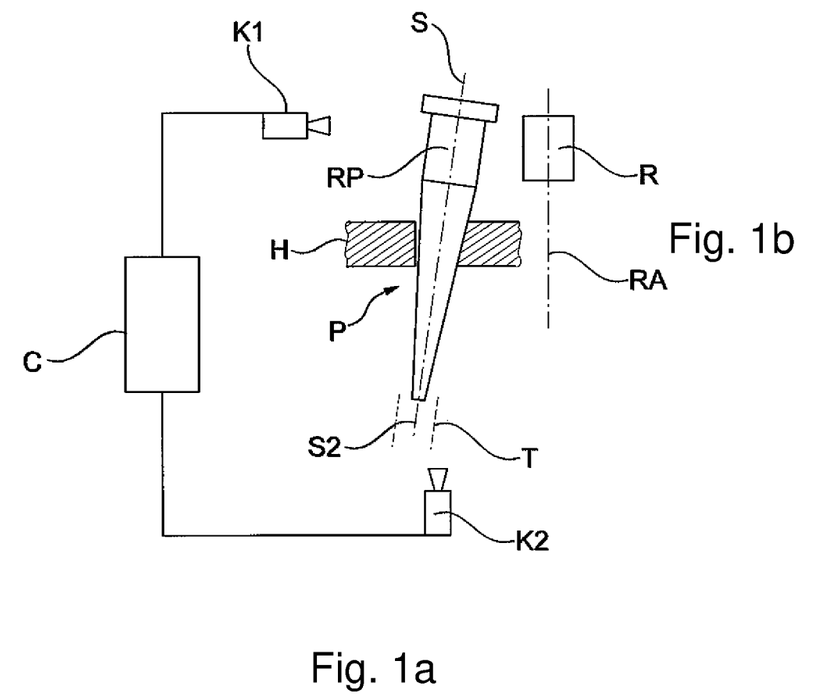

FIG. 1a schematically shows an injection-molded part P, which can also be a planar injection-molded part, having an axis of symmetry S corresponding to the longitudinal axis of the elongate injection-molded part P.

K1 designates an electronic detection means, for example a camera, which is aimed laterally at a rectangular reference area RP.

K2 designates a second electronic detection means, for example a camera, aimed in axial direction from below at the injection-molded part P.

In the electronic detection means K1 or a calculating unit C connected thereto, a rectangular reference area R is pre-set as reference area to be detected. From the middle between the two longitudinal sides of the rectangular reference area R, a reference axis RA can be calculated, for example, in the calculating unit C connected to the camera K1.

FIG. 1b shows the pre-set reference area R with the reference axis RA calculable therefrom. These givens in FIG. 1b are pre-set as zero value or base and, for example, stored in the calculating unit C, in order, starting from there, to carry out the necessary calculations of the subsequently given axis positions.

H designates a holding device like, for example, a workpiece carrier; the injection-molded part P is positioned in an inclined position in the bore thereof.

The reference area RP to be detected at the injection-molded part P is selected such that the axis of symmetry S of the injection-molded part P is calculable from the measurement data of the reference area RP.

The reference area RP at the injection-molded part P, when the image thereof shown by the camera K1 is correct, forms the reference area R pre-set in the calculating unit C; therefore, the reference area RP at the injection-molded part P is selected in advance and the correct representation thereof is derived, for example, from a drawing of the injection-molded part P, and stored in the calculating unit C as zero base.

For the inspecting of the position of the one pipette tip P in the workpiece carrier H, first, the reference area RP in an upper end area (first area 1 in FIG. 2a) of the pipette tip P is detected by the first detecting means K1 (first step).

Then, from the measurement data of the detected reference area RP, the axis of symmetry S of the injection-molded part P is calculated in the camera K1 or in the connected calculating unit C (second step).

With the second detection means, for example in form of the camera K2, the spatial position of the lower section S2 of axis of symmetry of the tip of the injection-molded part P in the second area 2 around the tip of the pipette tip P, spaced apart from the first, upper area 1 in axial direction, is detected (third step). FIG. 2*b* shows the second area 2 in enlarged representation.

Hereupon, it is determined whether the measured spatial position of the section S2 of axis of symmetry in the tip area corresponds with the before-calculated axis of symmetry S, or not (fourth step).

If there is correspondence between the spatial position of the section S2 of axis of symmetry and the axis of symmetry S, then it is assumed that the pipette tip P is correctly formed.

Figure 2A:
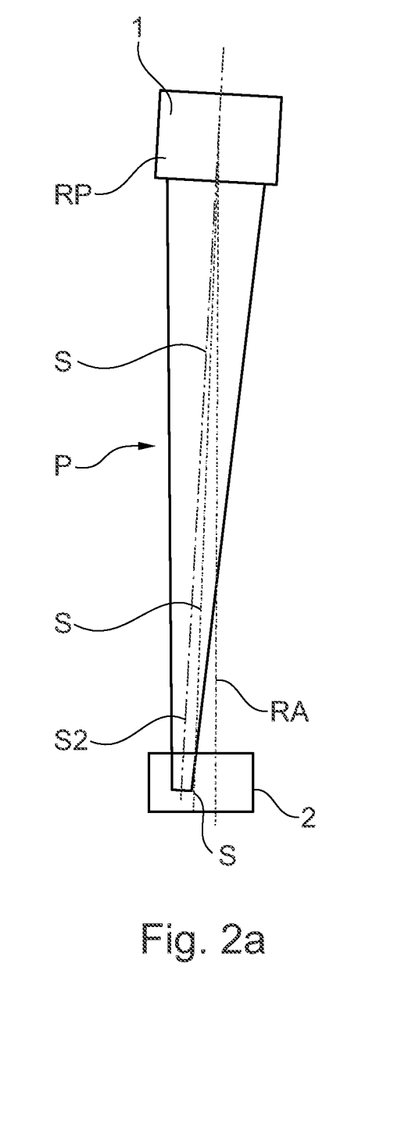
FIG. 2a shows a pipette tip in a lateral view with different axes, FIG. 2b schematically shows the tip of a pipette tip as a detail from FIG. 2a, FIG. 3 schematically shows a measurement arrangement with another detection of the reference area RP, FIG. 4 schematically shows a further modification of the measurement arrangement in the reference area, and FIG. 5 schematically shows detection means in the inside area of the pipette tip.
Figure 2B:
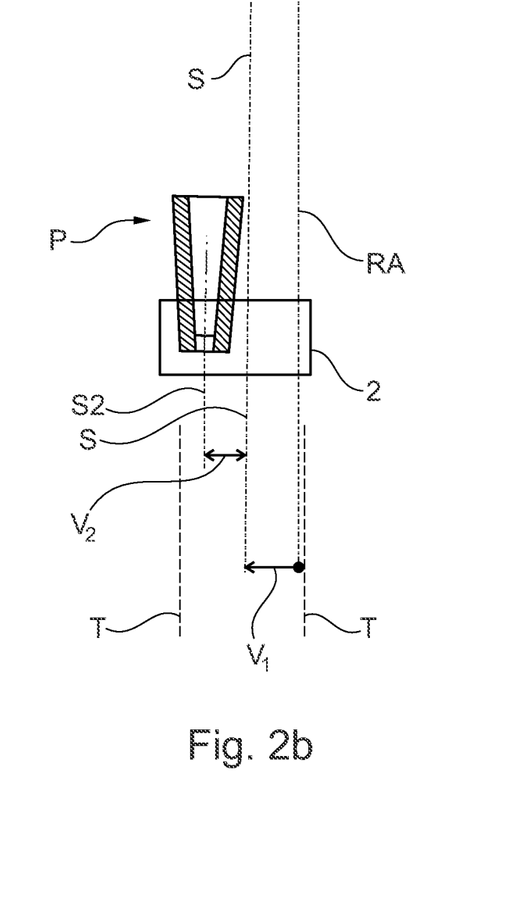

On the other hand, in the view in FIG. 1*a*, if a lateral distance or an offset of the section S2 of axis of symmetry from the before-calculated axis of symmetry S is determined, then there is a deformation of the lower end area of the pipette tip P, because the axis section S2 does not lie on the axis of symmetry S, as is shown, for example, by FIGS. 2*a* and 2*b*.

FIG. 1*a* schematically shows a tolerance area T around the axis of symmetry S, which is pre-set in the calculating unit C.

When the spatial position of the section S2 of axis of symmetry is inside the tolerance area T, that is, only diverges from the calculated axis of symmetry S within the frame of this tolerance area T, then the tip area is evaluated as being sufficiently correctly formed, so that it is not necessary to sort out the measured pipette tip P as waste.

This would be necessary, if the measured section S2 of axis of symmetry in the lower end area of the pipette tip P were to be outside of the tolerance area T around the axis of symmetry S.

In the representation of FIG. 1*a*, the section S2 of axis of symmetry lies on the axis of symmetry S.

Because, in practice, at an elongate pipette tip P the axis of symmetry S and the section $S_2$ of axis of symmetry will usually diverge from the calculational reference axis RA, the axis of symmetry S and the lower section S2 are more clearly represented in FIGS. 2 and 2*a*.

FIG. 2*a* schematically shows a pipette tip P having the different axes, which are shown in detail in enlarged representation in FIG. 2*b*.

In the embodiment represented in FIG. 2*a*, the axis of symmetry S of the pipette tip P calculated from the measurement of the reference area RP (first area) extends laterally offset to the left, for example due to an inclined position of the pipette tip P in the holder H or due to a slight deformation of the reference area RP in relation to the reference area R pre-set in the calculating unit C (FIG. 1*b*), so that the axis of symmetry S calculated from RP already diverges in the upper conical area of the pipette tip P from the reference axis RA calculated from R.

In addition, a deformation of the tip end area of the pipette tip P is present, because the lower area, which altogether is conical, in the lower end area is curved again to the left in FIG. 2*a*, so that the section S2 of axis of symmetry of the end area of the pipette tip is lateral of the axis of symmetry S of the pipette tip, which has the above-mentioned distance from the reference axis RA, which forms the calculational zero point.

FIG. 2*b* shows in enlarged representation the situation in the second measurement area 2 around the tip of the pipette tip P, wherein V1 represents the offset of the axis of symmetry S from the reference axis RA, and V2 the offset of the axis section S2 from the axis of symmetry S.

When the position of the section S2 of axis of symmetry of the tip of the pipette tip P is within the tolerance area T around the axis of symmetry S, as FIG. 2*b* shows, the inspection of the pipette tip P shows that a sufficiently correct shape is present.

When, however, the section S2 of axis of symmetry is outside of the tolerance area T in FIG. 2*b*, then the pipette tip P would be sorted out as too heavily deformed.

By this measurement, it is also possible by means of the electronic detection means K2 to detect exact measured values of the axis position in order to obtain, for example, statistical values of the axis divergence.

Figure 3:
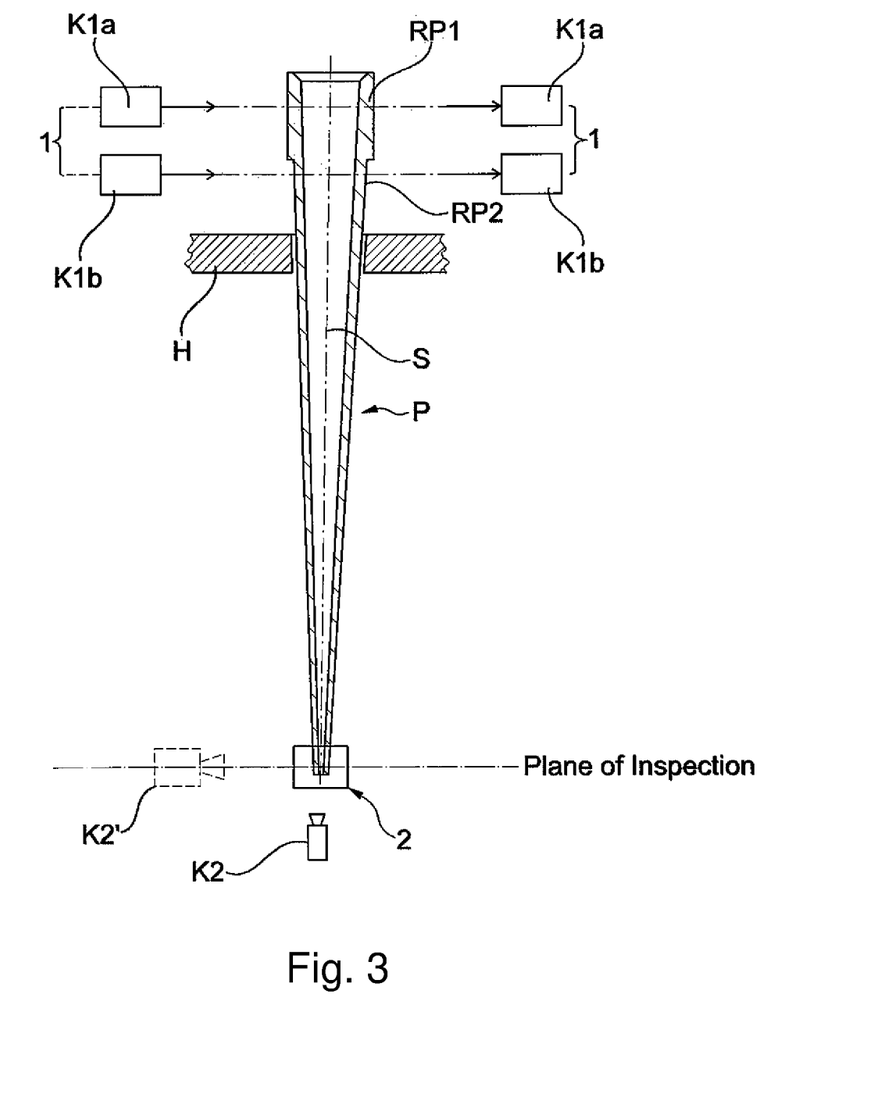

FIG. 3 schematically shows a measurement arrangement at a pipette tip P in a holding device H, wherein at the upper end area of the pipette tip P, by means of two spaced-apart detection means K1*a* and K1*b* arranged in axial direction below one another, the thickness dimension of the upper end portion of the pipette tip P is detected by a view transverse to the axial direction, so that, as a result, there are two cross-sectional views of the pipette tip having differently thick rings as reference areas $RP_1$ and $RP_2$. From the two rings, the axis of symmetry S can easily be calculated which, in case of correct shaping, coincides with the section S2 of axis of symmetry of the end area.

In very few individual cases, the axis of symmetry S calculated from the measured reference area RP can coincide with the reference axis RA calculated from the pre-set reference area R.

The first measurement area 1 ($RP_1$ and $RP_2$ in FIG. 3) is preferably provided at the upper end area of a pipette tip P, because this end area serves to detect the pipette tip with laboratory equipment during the later using of the pipette tip, wherein by means of the laboratory equipment the pipette tip is inserted into the narrow opening of another receptacle. Also, due to the larger wall thicknesses in the upper end area, the reference area RP is formed more dimensionally stable and less prone to distortion than an area with small wall thickness.

In case of a rotation-symmetric pipette tip, the reference area RP can for example be an inner and/or an outer shell surface in the upper end area, wherein the symmetry- or rotation-axis S can be calculated from the circular shape of the shell surface.

According to another embodiment, in a lateral view through the detection means K1, two spaced-apart inner and/or outer surface lines can form the reference area, which result at the shell surface in a lateral view of the upper end area in a pipette tip, wherein the axis of symmetry S in the middle can be calculated from the spaced-apart surface lines, as FIG. 1*a* also shows.

According to a further embodiment, two spaced-apart cross-sectional areas at the upper end area of the injection-molded part P can form reference areas in form of annular cross-sectional views, from which the axis of symmetry S can be calculated, as is derivable from FIG. 3.

According to a further embodiment, the upper plane surface of a pipette tip can be used as reference area.

It is also possible to measure different reference areas RP in order to balance their measured values.

In the embodiment described, the second measurement area 2 spaced apart from the first measurement area 1 is at the tip end of the pipette tip, but the second measurement area 2 can also be at another position on the pipette tip, in particular when another elongate injection-molded part than a pipette tip is concerned.

For the two measurement processes in the first and third step, for example two cameras K1 and K2 can be used, one of which is aimed from below at the pipette tip P in order to carry out the measurement in the third step, while a further camera in the first or upper end area of the pipette tip is aimed at the pipette tip P transverse to the axis thereof, in order to detect the reference area RP, as FIG. 1a shows.

It is also possible, in the lower measurement area 2 at the tip of the pipette tip, to laterally arrange a detection means like, for example, a camera K2' (FIG. 3) which, like the camera K1, is aimed at the axis of symmetry S at an angle of 90°. Furthermore, in the first measurement area 1 and/or in the second measurement area 2, detection means, for example cameras, can be provided vertically to the plane of the drawing in addition to the represented camera positions.

By means of a mirror arrangement it is also possible to operate with only one camera, which is aimed, for example, at the reference area RP transverse to the pipette tip P and detects the tip end of the pipette tip P also at the front end by means of a mirror deflection.

Depending on complexity, further camera positions can also be provided in order to carry out the two measurement processes in the first and third step, wherein detection means other than cameras can also be used, for example white light sensors (FIG. 5), interferometer- or infrared-sensors, 3D sensors or also stereo cameras, in particular when an inside shell surface at the upper end area of a pipette tip P is also used as reference area RP.

Figure 4:
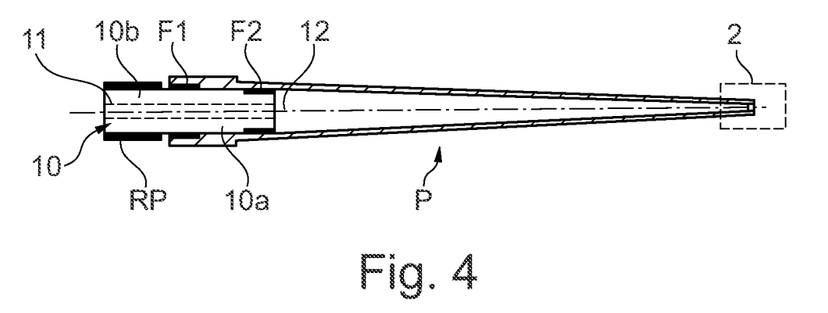

FIG. 4 schematically shows a measurement arrangement in which, in the first measurement area 1, a mandrel 10, at the exposed end of which a reference area RP is formed, is inserted into the upper end of the pipette tip P.

In other words, in this measurement arrangement, the reference area RP is formed separate from the pipette tip P at a metrological extension of the pipette tip P, wherein the mandrel 10 forms the extension.

The mandrel 10 has a lower conical portion 10a whose surface F corresponds to the inner circumference of the conical hollow space of the pipette tip P. In the embodiment shown, two ring surfaces $F_1$ and $F_2$, spaced apart in axial direction, are formed on the conical portion 10a as contact surfaces which exactly correspond to the inner circumference of the pipette tip P, so that, when the mandrel 10 is inserted, a defined contact surface of the pipette tip P at the mandrel results.

The annular contact surfaces $F_1$ and $F_2$ can also be comprised into a single longer contact surface F.

On the exposed outer end 10b of the mandrel 10, a reference area RP is formed, which is detected by detection means K not shown in FIG. 4, in order to calculate, from the data of the reference area RP, the reference axis RA of the mandrel 10, which, due to the planar abutment of the mandrel 10 at the contact surfaces $F_1$ and $F_2$, corresponds with the axis of symmetry S of the pipette tip in the first measurement area 1.

The mandrel 10 can be provided with a longitudinal bore 11, so that by applying underpressure at the outside mandrel end, the pipette tip P can be sucked into the position represented in FIG. 4.

In the measurement arrangement in FIG. 4, first, the mandrel 10 is measured in its position by not-shown electronic detection means, so that the output data like reference area RP and axis 12 of the mandrel 10 are determined for the further calculations.

Then, by applying underpressure at the bore 11 of the mandrel 10, a pipette tip P is sucked on, so that the contact surfaces F of the mandrel abut by means of their entire surfaces at the inner circumferential surfaces of the pipette tip.

The axis of symmetry S of the pipette tip P is calculated by means of the reference area RP, wherein it is assumed that the axis of symmetry S of the pipette tip P in the area of the abutment at the mandrel is identical with the axis of symmetry 12 of the mandrel 10.

The measurement in the measurement area 2 at the tip of the pipette tip P can be carried out in different ways in this measurement arrangement.

The mandrel 10 can be rotatably supported. By rotating of the mandrel 10 and sensing of the tip end of the pipette tip in the measurement area 2 by means of an electronic detection means like, for example, the camera K2, the divergence of the section S2 of axis of symmetry from the axis of symmetry S during rotation can be determined. The evaluation takes place as illustrated with reference to FIGS. 2 and 2a.

Furthermore, when the mandrel 10 is fixed, the measuring can be carried out by means of two electronic detection means, like cameras K1 and K2, which are offset in relation to one another by 90°, as illustrated by means of FIG. 1a.

Advantageously, the image recording of the reference area RP in the measurement area 1 and of the tip of the pipette tip P in the measurement area 2 is carried out at the same time. As a result, pseudo errors due to oscillations and the like are significantly reduced.

After the measuring, the pipette tip P can be released from the mandrel by applying superpressure at the bore 11 of the mandrel 10, and discharged in a receptacle. Alternatively, a sleeve can also be provided at the outside end of the mandrel displaceable in relation thereto, in order to pull the pipette tip P off the mandrel 10.

Figure 5:
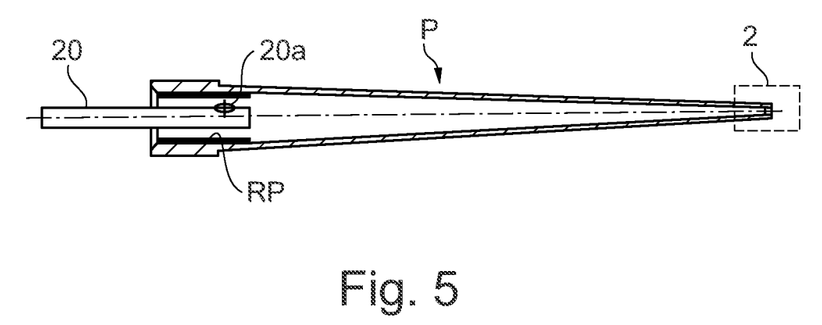

FIG. 5 shows a further measurement arrangement for detecting the reference area RP on the inner circumference of a pipette tip P by means of a white light sensor 20, which scans the inner circumferential area F of the pipette tip P, preferably by means of rotating of the sensor 20. In the embodiment shown, only one sensor element 20a is provided at the white light sensor. Sensor elements spaced apart in axial direction can also be provided, which in a relative rotation between pipette tip P and sensor 20 scan two spaced-apart circles on the inner circumferential area.

Instead of a contact-free white light sensor 20, an interferometer sensor can also scan the inner circumferential area of the pipette tip P in a contact-free manner for detecting the reference area RP, which is inserted into the pipette tip P in the same way as the white light sensor 20.

The invention claimed is:

1. A method for inspecting elongate injection-molded parts having an axis of symmetry, in a holding device, comprising the following steps:

detecting a reference area extending in axial direction of the injection-molded part in a first measurement area of the elongate injection-molded part in the holding device through an electronic detector, wherein the reference area is selected such that a first axis of symmetry of the injection-molded part can be calculated according to its orientation, shape, and position in the reference area from the measurement data of the reference area (first step), calculating the first axis of symmetry in the reference area from the measurement data of the measured reference area (second step), measuring the spatial position of a section of axis of symmetry of a second measurement area, spaced apart from the first measurement area in axial direction, of the elongate injection-molded part including an orientation and position of an axis of symmetry within the section of axis of symmetry (third step), and determining whether the spatial position of the axis of symmetry of the section of axis of symmetry, measured in the third step, of the injection-molded part, coincides in the second measurement area with the axis of symmetry calculated in the second step, or not.

2. The method according to claim 1, wherein a tolerance area is determined around an axis of symmetry calculated from the reference area and it is calculated whether the position of the section of axis of symmetry detected by measuring is within the tolerance area, or not.

3. The method according to claim 1, wherein a shell surface or a part of a shell surface at a rotation-symmetric injection-molded part is used as reference area in the first measurement area.

4. The method according to claim 1, wherein at least an area transverse to the axis of symmetry of the injection-molded part is used as reference area.

5. The method according to claim 4, wherein two cross-sectional areas of the injection-molded part, which are spaced-apart in axial direction and transverse to the axis of symmetry, are used as reference areas.

6. The method according to claim 1, wherein the reference area is detected by a camera which is aimed, transverse to the axis of symmetry, at the reference area.

7. The method according to claim 1, wherein the position of the section of axis of symmetry of the injection-molded part is measured by a camera, which is aimed in axial direction at the second measurement area of the injection-molded part.

8. The method according to claim 6, wherein by the camera with mirror deflections, in axial direction the position of the section of axis of symmetry is detected and, as well, transverse to the axial direction, the measurement data of the reference area are detected.

9. A device for inspecting elongate injection-molded parts having an axis of symmetry, in a holding device, comprising:
a calculating unit, in which a reference area at the injection-molded part to be measured is pre-set as calculation base,
wherein a reference axis can be calculated from the data of the reference area,
at least an electronic detector which is aimed at an injection-molded part held in the holding device, transverse to an axis of symmetry thereof and is formed such that
the electronic detector detects a reference area at the injection-molded part corresponding to the reference area pre-set in the calculating unit, and calculates a first axis of symmetry within the measured reference area according to the orientation, shape, and position in the reference area from the measurement data, and
at least a further electronic detector for measuring an axis of symmetry in a second measurement area at a distance in axial direction from a first measurement area on the basis of an orientation and position of the injection-molded part within a section of axis of symmetry in the second measurement area,
wherein the calculating unit is formed for determining an agreement or not agreement of the spatial position of the axis of symmetry in the section of axis of symmetry in the second measurement area and the calculated axis of symmetry in the reference area.

10. The device according to claim 9, wherein the electronic detector in the first measurement area and/or in the second measurement area offset to one another by 90°, is aimed at the axis of symmetry of the injection-molded part.

11. The device according to claim 9, wherein the electronic detector in the first measurement area is aimed transverse to the axis of symmetry of the injection-molded part and in the second measurement area the electronic detector is aimed in axial direction at a front end of the injection-molded part.

12. The device according to claim 9, wherein the electronic detector in the first measurement area and a second electronic detector in the first measurement area are spaced apart in axial direction and are aimed laterally to the axis of symmetry of the injection-molded part for detecting a cross-sectional area of the injection-molded part as reference area.

13. The device according to claim 9, wherein the at least one electronic detector and the at least one further electronic detector comprise electronic cameras, interferometers or infrared sensors, 3D sensors or stereo cameras.

14. The device according to claim 9, wherein a mandrel is provided for receiving a rotation-symmetric injection-molded part, the rotation-symmetric injection-molded part comprising a pipette tip, wherein the mandrel abuts by means of a contact surface at the inner circumference of the pipette tip and has the reference area on an exposed portion.

15. The device according to claim 14, wherein the mandrel is provided with a longitudinal bore for applying underpressure or overpressure.

16. The device according to claim 14, wherein the mandrel is rotatably supported.

\* \* \* \* \*